United States Patent [19]

Aoki et al.

[11] 3,865,474

[45] Feb. 11, 1975

[54] SYSTEM FOR SYNCHRONIZING MOTION PICTURE APPARATUS WITH TAPE RECORDER

[75] Inventors: Chihiro Aoki, Aichi; Hiromichi Sakai, Ichinomiya, both of Japan

[73] Assignee: Elmo Co. Ltd., Nagoya, Aichi Prefecture, Japan

[22] Filed: Sept. 19, 1973

[21] Appl. No.: 398,781

[30] Foreign Application Priority Data

Sept. 25, 1972 Japan .............................. 47-95200

[52] U.S. Cl. .............................. 352/22, 360/105

[51] Int. Cl. .............................. B03b 31/04

[58] Field of Search ........... 352/22, 25, 31; 360/80, 360/105

[56] References Cited

UNITED STATES PATENTS

| | | | |
|---|---|---|---|
| 1,973,400 | 9/1934 | Tharrondo | 352/22 |
| 3,260,609 | 11/1971 | John, Jr. | 352/22 X |
| 3,733,117 | 5/1973 | Ogiso et al. | 352/22 |

*Primary Examiner*—Samuel S. Matthews
*Assistant Examiner*—Michael L. Gellner
*Attorney, Agent, or Firm*—Wenderoth, Lind & Ponack

[57] ABSTRACT

A system for synchronizing a motion picture apparatus containing a motor, which attains a steady-state speed substantially instantaneously after the current supply thereto, with a tape recorder including a motor, which takes a considerably long time as compared with that required by the motor of the motion picture apparatus to attain a steady-state speed. The motor of the tape recorder is caused to start by operating a starting button provided to the motion picture apparatus, but the magnetic tape having audio signals and synchronizing pulse signals recorded on different tracks thereof is driven with the delay of a time corresponding to a time necessary for the motor of the tape recorder to attain the steady-state speed. Simultaneously with the driving of the magnetic tape, a starting signal is generated and transmitted to the motor of the motion picture apparatus to cause the starting thereof. Thus, the motion picture film and the magnetic tape can be driven substantially at the same time point. When the operation of the starting button of the motion picture apparatus is released, the current supply to the motor of the motion picture apparatus is shut off and thereafter a shutter provided in the motion picture apparatus continues to rotate until it reaches a predetermined angular position. When the shutter reaches this position, a stop signal is generated to stop the motor of the tape recorder.

11 Claims, 10 Drawing Figures

SYSTEM FOR SYNCHRONIZING MOTION PICTURE APPARATUS WITH TAPE RECORDER

BACKGROUND OF THE INVENTION

This invention relates to a system for synchronizing a motion picture apparatus, such as, a motion picture camera and a motion picture projector, with a tape recorder.

Recently, motion picture films and magnetic tapes have been on sale with being held in a plastic cartridge or cassette designed to eliminate manual film or tape threading. Cartridge or Cassette motion picture cameras and tape recorders have been made simple in operation and portable. This makes it possible for anyone to effect the simultaneous recording of motion pictures and accompanying sounds on the motion picture film and the magnetic tape, although the carrying out of such recording hs been deemed to require much skill and costly constructions.

When simultaneously recording the motion pictures and the accompanying sounds, it is essential to effect a complete synchronization between the sounds on the magnetic tape to be transported by the tape recorder and the motion pictures recorded on the motion picture film by the motion picture camera. To do so is very difficult because the separate cartridge or casette machines, i.e., motion picture camera and tape recorder employ different characteristics of strip driving motors and mechanisms for transmitting the motions of the strip driving motors to the strips are also different in construction from each other. For example, even if the motors start to rotate at the same time point, they will take different times to attain the predetermined steady-state speed, with the attendant disadvantage of failing to provide synchronization of the motion picture and accompanying sounds.

Especially, it is noted that the motor of the motion picture attains the steady-state speed in an instant after operating a starting button, but the motor of the tape recorder takes a relatively long time to reach its steady-state speed. This is because a system for transmitting the motion of the tape recorder motor to the magnetic tape has to include a heavy flywheel in order to eliminate wow and flutter in the recorder caused by variations in the speed of the magnetic tape. Therefore, it has been difficult with the prior technique of simultaneous recording to control synchronization of each picture frame of the motion picture film and accompanying sound on the magnetic tape to a high degree of accuracy.

It is accordingly a principal object of this invention to provide a new system for synchronizing a motion picture apparatus with a tape recorder, which eliminates the abovementioned disadvantages of the prior synchronizing systems.

SUMMARY OF THE INVENTION

Briefly, this invention accomplishes the above object by providing a system for effecting a synchronized operation between a motion picture apparatus containing a motor, which attains a steady-state speed substantially instantaneously after the current supply thereto, and a tape recorder including a motor, which takes a considerably long time as compared with that required by the motor of the motion picture apparatus to attain a steady-state speed. The system comprises means for starting the motor of the tape recorder in response to operation of the motor picture apparatus for starting thereof, means for transporting the magnetic tape with the delay of at least the said time necessary for the tape recorder motor to reach the steady-state speed, means for generating a starting signal to start the motor of the motion picture apparatus to thereby transport the motion picture film substantially at the same time point as the magnetic tape, and means for generating a stop signal, when the operation of the motion picture apparatus for starting thereof is released, to stop the rotations of the motors.

BRIEF DESCRIPTION OF THE DRAWINGS

The subject matter which is regarded as this invention is particularly pointed out and distinctly claimed below. The invention, however, will best be understood by reference to the following description taken in conjunction with the accompanying drawings, in which:

DESCRIPTION OF THE PREFERRED EMBODIMENTS

Figures 1, 2, 3, 4:
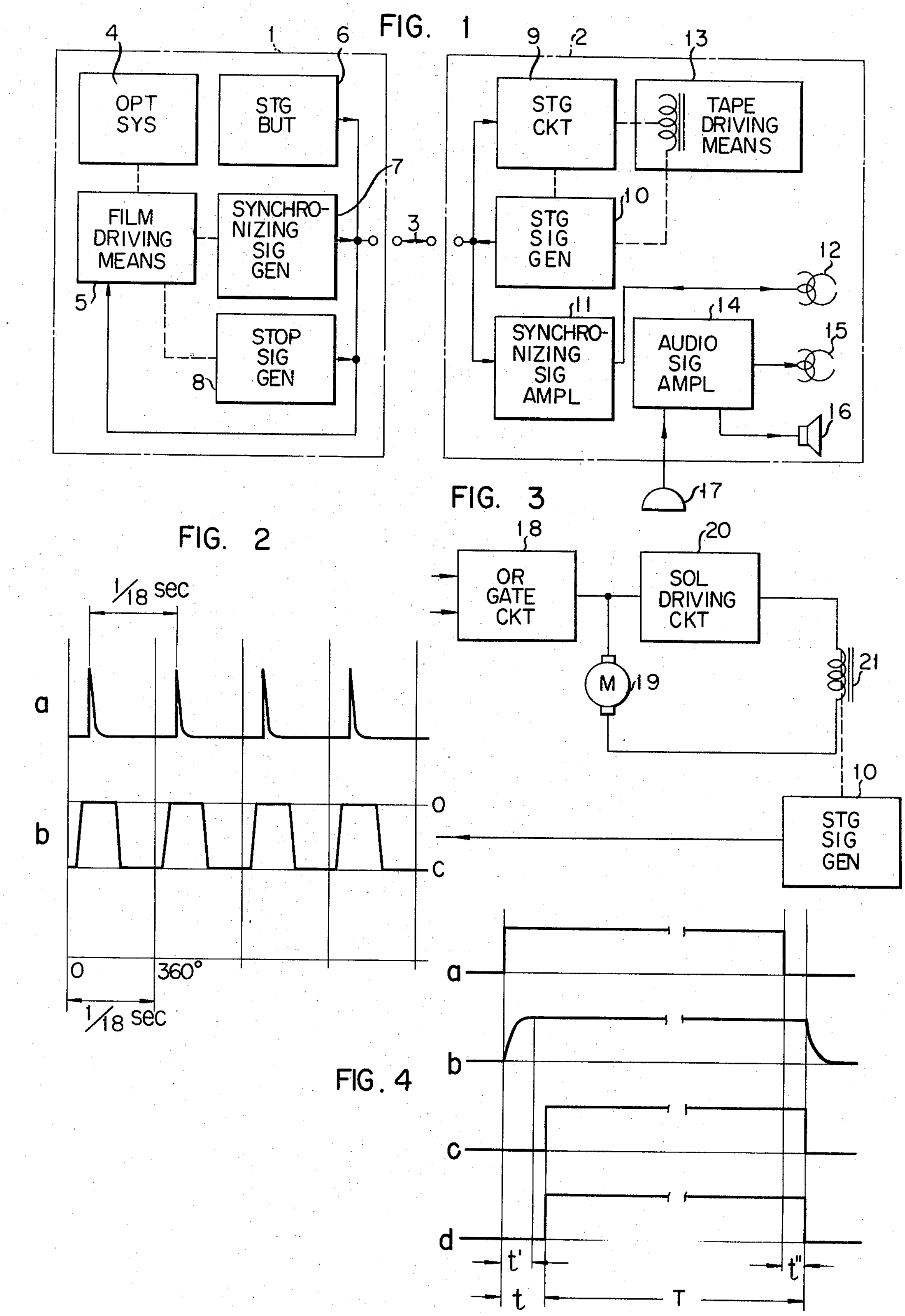
FIG. 1 is a block diagram showing a system for synchronizing a motion picture camera with a tape recorder embodying this invention.
FIGS. 2(*a*) and 2(*b*) illustrate diagrammatically the relations of synchronizing signals developed by a synchronizing signal generator arranged in the motion picture camera with opening and closing operations of the shutter arranged in the motion picture camera.
FIG. 3 is a block diagram of a motor circuit of the tape recorder.
FIG. 4 illustrates diagrammatically the operations of the motion picture camera and the tape recorder according to the invention.

Referring to the drawings, FIG. 1 is a block diagram useful in explaining the principle of the present invention, which shows a system for synchronizing a motion picture camera 1 with a tape recorder 2. In this example, the motion picture camera is the reference apparatus and the tape recorder is the apparatus to be synchronized with the motion picture camera. However, this invention is not limited to such duties of the motion picture camera and the tape recorder. This invention is not also limited to the motion picture camera.

In the block diagram of FIG. 1, the motion picture camera 1 and the tape recorder 2 are electrically connected to each other through, for example, a cable 3. The motion picture camera 1 includes an optical system 4 comprising a taking lens (not shown), a film driving means 5 comprising a motor (not shown), a mechanism (not shown) for transmitting the motion of the motor to the film, etc., and a starting button 6 for causing the start and the stop of the synchronous operation of the motion picture camera 1 with the tape recorder 2. The starting button 6 may be or may not be a release button normally provided in the motion picture camera. The motion picture camera 1 further includes a synchronizing signal generator 7, which is adapted to generate one synchronizing pulse signal for, for example, one complete rotation of the shutter of the motion picture camera 1, that is, for one frame of the film, and a stop signal generator 8 for generating a stop signal to stop the tape recorder 2 when the shutter reaches its predetermined angular position as will be hereinafter described.

In the tape recorder 2, there are a circuit 9 for starting the tape recorder, a starting signal generator 10 generating a starting signal to cause the starting of the motioin picture camera 1 after the lapse of a predetermined time from the operation of the starting button 6 provided in the motion picture camera, and a synchronizing signal amplifier 11 to amplify the synchronizing signal developed by the synchronizing signal generator 7, the amplified output signal of the amplifier being recorded through a magnetic head 12 on a magnetic tape (not shown). The tape recorder 2 further includes a tape driving means 13 comprising a motor (not shown), a mechanism (not shown) for transmitting the motion of the motor to the magnetic tape, etc., and an audio signal amplifier 14 to which a magnetic head 15, a speaker 16 and a microphone 17 are connected in a known manner.

FIG. 2(*a*) shows a waveform of the synchronizing signals developed by the synchronizing signal generator 7 disposed in the motion picture camera 1, these synchronizing signals being recorded on a track of the magnetic tape through the synchronizing signal amplifier 11 and the magnetic head 12, which track differs from a track on which sound is to be recorded. As shown in FIG. 2(*a*), the synchronizing signals are generated and recorded at a rate proportional to the taking speed of the motion picture film, for example, at the speed of 18 or 36 frames per second in the case of an 8 mm motion picture film. FIG. 2(*b*) shows the closisng and opening of the shutter for the taking of each frame, the letter "*o*" representing the open state of the shutter and the letter "*c*" representing the closed state of the shutter.

FIG. 3 is a block diagram of a motor circuit in the tape recorder 2, which includes an OR gate circuit 18 connected in series to a solenoid driving circuit 20 for energizing a solenoid 21, and a motor 19 for the tape recorder connected through the solenoid 21 across the solenoid driving circuit 20. It is seen that this motor circuit comprises a circuit to provide the solenoid 21 with a high current at the beginning and a delay circuit.

FIG. 4 illustrates diagrammatically the operations of the motion picture camera and the tape recorder, in which the curve (*a*) shows the operation of the starting button 6 of the motion picture camera 1, the curves (*b*) and (*c*) show respectively the operations of the motor 19 and solenoid 21 of the tape recorder 2, and the curve (*d*) shows the operation of the motor of the motion picture camera 1. That is, the camera motor operates for the time T after the lapse of "*t*" time from the operation of the starting button 6. The letter *t'* represents a time which is required for the motor 19 of the tape recorder 2 to reach its steady state, and the time *t'* substantially equals the time *t*.

Figure 5:
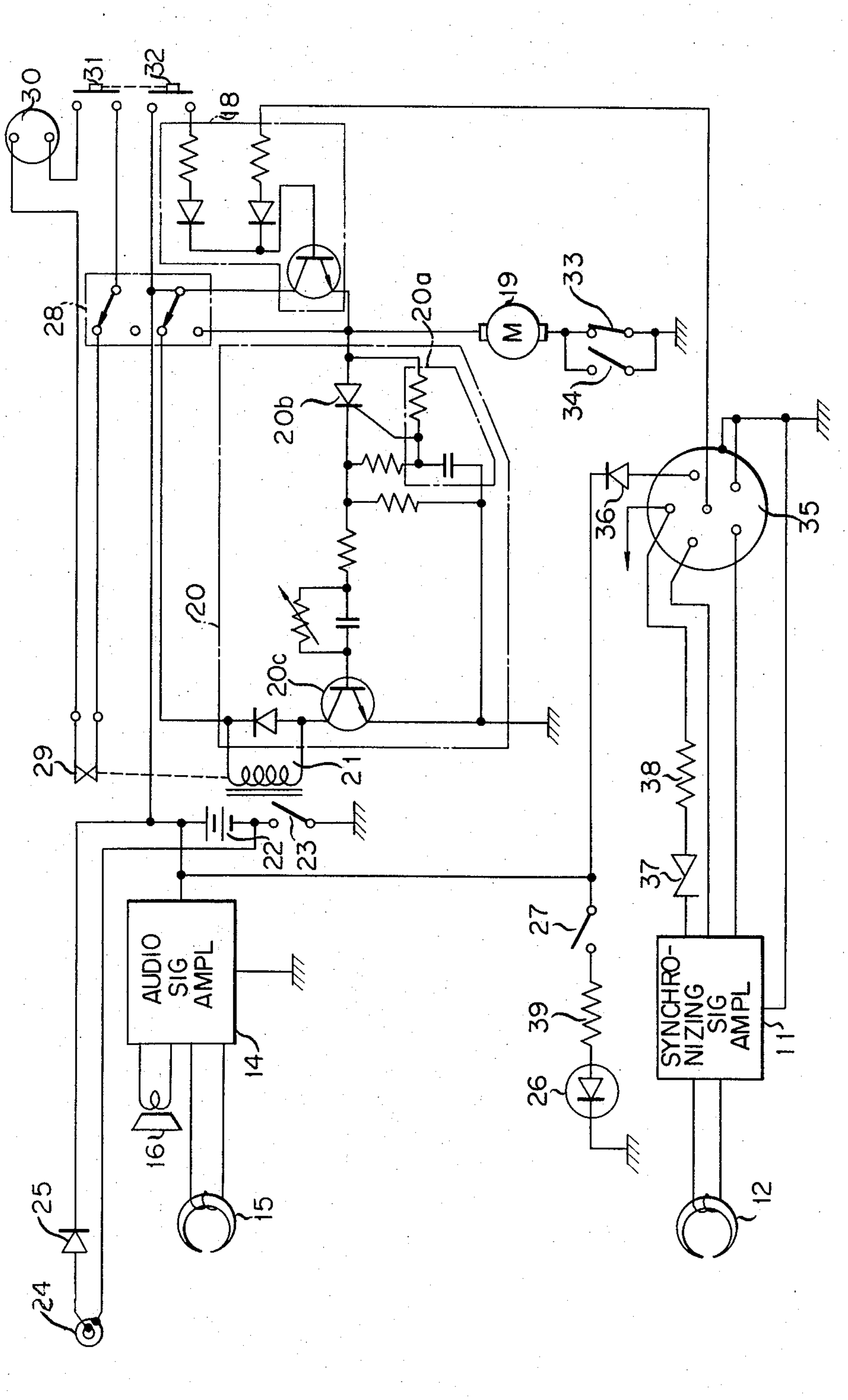
FIG. 5 is a schematic wiring diagram of the tape recorder.

FIG. 5 is a schematic wiring diagram of the tape recorder 2 shown in the block diagram of FIG. 1, wherein a built-in power source 22 is provided in series relation with a main switch 23 and a series combination of a connector 24 and diode 25 is connected across the power source 22. The connector 24 is to supply externally the tape recorder 2 with a current flow and the diode 25 is to prevent the current flow originated from the power source 22 from flowing into the external current source through the connector 24. A luminous diode 26 is provided to indicate, when a switch 27 is closed upon the operation of a record lever as referred to hereinafter, the recording state of the tape recorder 2, that is, the level at which the recording is being made. A switching means 28 allows the tape recorder 2 to be used alone and to be used with the motion picture apparatus, such as, the motion picture camera in a synchronous manner. In FIG. 5, the switching means 28 is set in the state allowing the tape recorder 2 to be operated in synchronism with the motion picture camera 1. Connected to the switching means 28 are a normally open contact 29, the opening and closing thereof being caused by the solenoid 21, a connector 30 for transmitting the starting signal to the motor of the motion picture camera 1 thereby to start the latter, and a pair of switches 31 and 32 both closed in cooperation with the operation of the starting button 6 of the motion picture camera 1. Connected in series to the motor 19 are a pair of switches 33 and 34 for providing the motor 19 with the current from the source 22 or the external power source. The switch 33 is to cause the motor 19 to feed the magnetic tape forwards at normal speed and the switch 34 is to cause the motor 19 to feed the magnetic tape backwards or to take up the tape at high speed. As will be mentioned below, a connector 35 acts to electrically connect the tape recorder 2 with the motion picture camera 1 when recording the sound or to a motion picture projector when reproducing the sound. A varister 37 along with a resistor 38 acts to cut a noise peculier to the synchronizing signal from the synchronizing signal amplifier 11. A resistor 39 is provided between the luminous diode 26 and the switch 27 to control the level of a current flowing through the luminous diode 26.

Figures 6, 9:
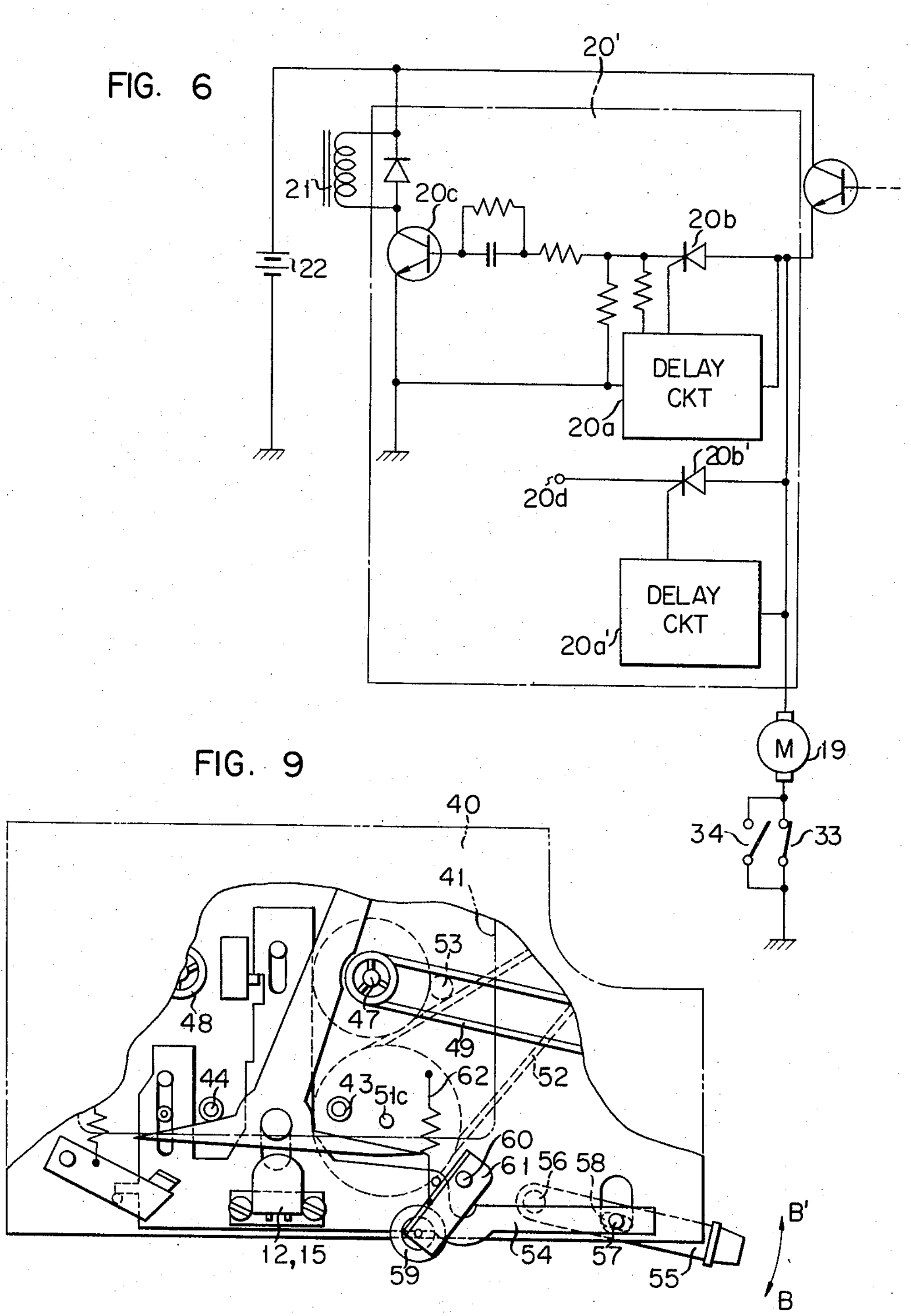
FIG. 6 is a wiring diagram showing a starting signal generator in modified form.
FIGS. 7 to 9 are diagrammatic views of the construction of the tape recorder illustrating the operation at various conditions thereof.

In stead of the normally open contact 29 shown in FIG. 5, a circuit means shown in FIG. 6 may be used as the starting signal generator 10 of FIG. 1, which generates a signal for starting the motor of the motion picture camera after the motor of the tape recorder has attained its steady-state speed. By employing the circuit means of FIG. 6, it is made possible to carry out the starting signal generating operation, which is performed mechanically in the arrangement of FIG. 5 by the contact 29, in a fully electrical manner. For the purpose of doing so, it is necessary to provide the solenoid driving circuit 20 of FIG. 5 with, in addition to the delay circuit 20*a*, a delay circuit 20*a'* connected in parallel to the delay circuit 20*a*. The delay circuit 20*a'* causes the current flowing therethrough to undergo a delay, the time of which equals or is slightly longer than the delay time by the delay circuit 20*a*. The starting signal is supplied through a thyristor 20*b'* and a terminal 20*d* to the motion picture camera without employing the assistance of the solenoid 21. Therefore, this circuit means can eliminate the undesirable influence of a mechanical time delay caused by the solenoid 21, resulting in an easy adjustment of a value of delay time necessary for the complete synchronization.

Figure 7:
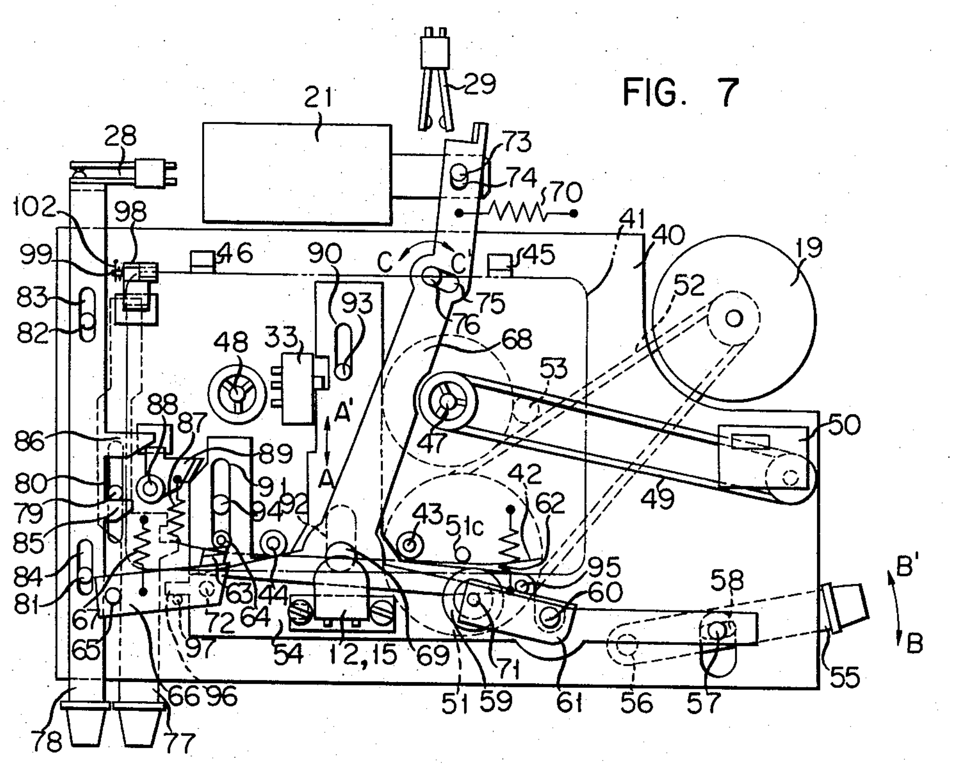
Figure 8:
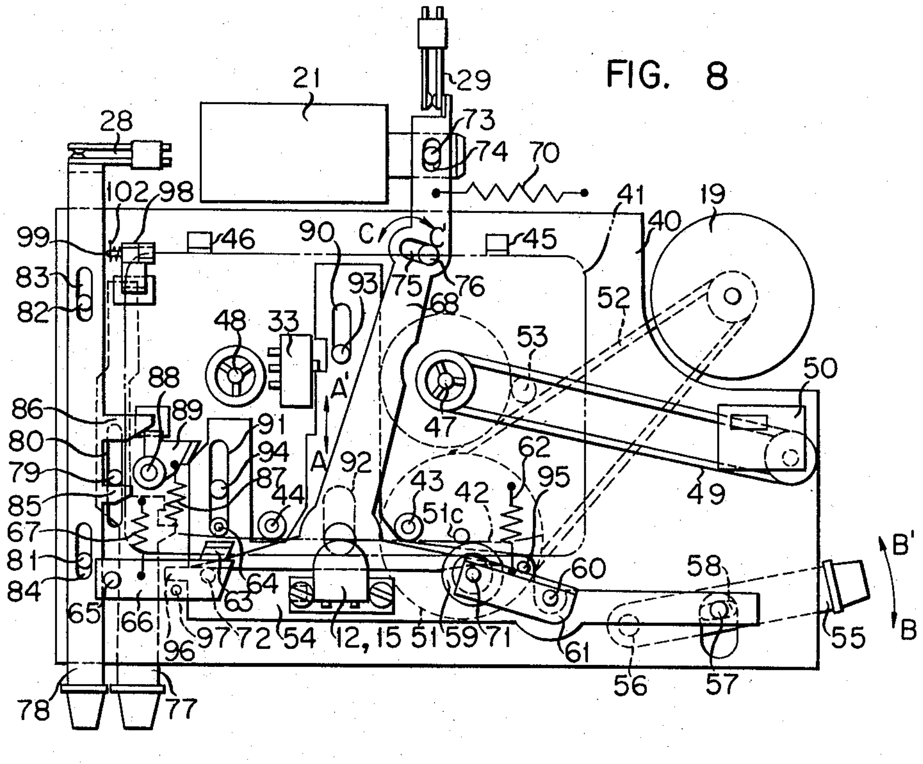

FIGS. 7, 8 and 9 show the mechanical construction of the tape recorder 2 embodying the present invention. Especially, FIG. 7 shows the tape recorder put in the recording state with the tape held stationary and FIG. 8 shows the tape recorder put in the sound reproducing state with the tape running. In FIGS. 7, 8 and 9, the tape recorder 2 is provided with a base or a mounting plate 40 to which a number of elements necessary for the tape transport are attached. For example, a tape cassette 41 containing a magnetic tape 42, which may be of a known type, is mounted on the base 40 by a pair of pins 43 and 44 projecting from the base surface into the cassette 41 and by a pair of members 45 and 46 restricting the vertical movement of the cassette 41. Furthermore, on the base plate 40, there are a take-up hub spindle 47 and a supply hub spindle 48, the spindle 47 being connected in driving relation with an index counter 50 through a belt 49. A capstan 51*c* integral with a flywheel 51 is connected through a belt 52 with the motor 19 thereby to be rotated at constant speed. The take-up and supply hub spindles 47 and 48 are adapted to be connected in a well known manner with the motor 19 through the belt 52, the idler 53, etc. so that the tape 42 can be fed in both of the forward and reverse directions. The magnetic heads 12 and 15 formed into a single unit are secured to a plate member 54 which is mounted on the base 40 for sliding movement in the directions A and A′ as shown by the double headed arrow. A shift lever 55 is turnable about a pin 56 on the base 40 in the directions B and B′ and held in two positions, as shown in FIGS. 7 and 9, by the action of a suitable holding means, such as, a click spring (not shown). The shift lever 55 is in pin-slit connection with the plate member 54 as shown at 57 and 58, whereby the member 54 can be moved in the directions A and A′ upon the turning of the shift lever 55. A pinch roller 59 is arranged so that the tape 42 can be pressed against the periphery of the capstan 51*c*, thereby allowing the tape 42 to be driven at the constant speed. The pinch roller 59 is supported by a mounting plate 61 turnable on a pin 60 mounted on the base 40, and the pinch roller 59 is biased in the clockwise direction by a spring 62. A brake member 63 is adapted to be able to engage a guide pin 64 embedded in the base plate 40 to stop the tape 42, which tends to coast even after the stoppage of the motor 19. The brake member 63 is held by a mounting plate 66 turnable about a pin 65 mounted on the base plate 40 and biased in the counterclockwise direction by a spring 67. An inverse T-shaped lever 68 can rotate about a pin 69 against the action of a spring 70 when the solenoid 21 is energized. The ends of the arms of T can be brought into and out of engagement with support pins 71 and 72 for the mounting plates 61 and 66 which have the pinch roller 59 and the brake member 63 mounted thereon respectively. Furthermore, the solenoid 21 and the lever 68 are in pin-slit connection with each other as shown at 73 and 74, and a slit 75 provided in the lever 68 acts as a guide for the movement of a pin 76 embeded in the base plate 40. To close and open the switching means 28 thereby to cause the solenoid 21 to be energized, a lever 78 is mounted on the base plate 40 for sliding movement by pins 81 and 82 and slits 83 and 84. A record lever 77 is also mounted on the base plate 40 for sliding movement by a combination of a pin 79 and slit 80. Both the levers 77 and 78 can move vertically, i.e., in the directions A and A′. The record lever 77 has the pin 79 embeded therein to allow it to engage a lower projection 85 of the lever 78. An upper projection 86 of the lever 78 can force a stop 89 in the counterclockwise direction against the action of a spring 87, whereby the stop 89 causes the lever 78 to be held in a depressed position in which the switching lever 28 is closed. The stop 89 is engageable with the aforementioned sliding plate 54 and turnable on a pin 88 attached to the base plate 40. In the sliding plate 54, slits 90, 91 and 92 are provided to guide the movement of the sliding plate 54 in the directions A and A′ in cooperation with pins 69, 93 and 94 attached to the base plate 40. In addition, the sliding plate 54 is provided with a pin 95 and a projection 96 which engage respectively, when the sliding plate 54 is moved by operating the shift lever 55, an edge of the mounting plate 61 having the pinch roller 59 mounted thereon and a pin 97 provided on the mounting plate 66 supporting the brake member 63, whereupon the pinch roller 59 and the brake member 63 are placed in their position shown in FIG. 9, resulting in an easy fitting of the cassette 41 into the tape recorder.

Figure 10:
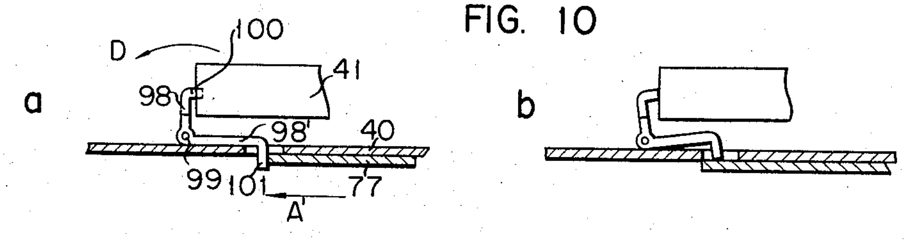
FIGS. 10(*a*) and 10(*b*) are fragmental sectional views of the arrangement for preventing the mis-erasing of the sound recorded on the magnetic tape.

In FIGS. 7, 8 and 10, mounted on the base plate 40 to prevent mis-erasing of the sound recorded is a substantially L-shaped member comprising two arms 98 and 98′, which member is turnable in the direction D (see FIG. 10) about a pin 99 positioned at the connection of two arms 98 and 98′. The extremity 100 of the arm is adapted to engage a known notch (not show) provided in the cassette for preventing the mis-erasing. For example, where the notch member is not provided in the cassette 41, the extremity 100 is allowed to engage the side wall of the cassette 41 and the extremity 101 of the arm 98′ prevents the record lever 77 from moving in the direction A′, not allowing the recording. In contrast, where the notch is provided, the arm 98 is turnable in the direction D against the action of a spring 102 (see FIGS. 7 and 8), thus allowing the sliding of the record lever 77 necessary to set the tape recorder in the recording condition.

In operation, it is necessary to make preparations for the synchronous driving of the motion picture camera and the tape recorder. With respect to the motion picture camera, a cartridge containing a motion picture film is fitted into the camera in a well known manner and, with respect to the tape recorder, the cassette 41 is fitted thereinto. When fitting the cassette 41 into the tape recorder, the latter is in the condition shown in FIG. 9. That is, the sliding plate 54 is biased in the direction A by the switch lever 55 and therefore the magnetic heads 12 and 15 are retracted to a position that the cassette 41 is not prevented from fitting into the tape recorder. At the same time, the pinch roller 59 and the brake member 63 are also brought into their retracted positions since the pin 95 and the projection 96 mounted on the sliding plate 54 force respectively the mounting plates 61 and 66, which carry the pinch roller 59 and the brake member 63, in the respective retracted position. Thus, the fitting of the cassette 41 into the tape recorder can be effected with ease. Upon the insertion of the cassette 41, it is held in position on the base plate 40 by the pins 43 and 44 and the members 45 and 46. Then, the connectors 30 and 35 (see FIG. 5) of the tape recorder are electrically connected through the cable 3 (see FIG. 1) or other means with a connector or connectors (not shown) of the motion picture camera. Furthermore, as shown in FIG. 7, the lever 78 is slided in the direction A′ along the slits 83 and 84, whereby the projection 85 of the lever 78 is brought into engagement with the pin 79 on the record lever 77 to move the record lever 77 in the direction A′ along the slit 80. Under this condition of the arrangement shown in FIG. 7, the switch lever 55 is reversed to the direction B to thereby slide the sliding plate 54, which is connected to the switch lever 55, along the slits 90, 91 and 92 in the direction A. By such sliding of the sliding plate 54, the stop 89 is forced against the action of the spring 87 to turn about the pin 88 in the counterclockwise direction. This causes the projection 86 of the lever 78 to be engaged with the stop 89 and the lever 78 is not allowed to move back in the direction A by a not shown spring. Therefore, the lever 78 is held stationary with its upper end pressing the switching means 28. Also, the switch 33 is closed upon the sliding of the sliding plate 54. FIG. 5 shows the wiring diagram of the tape recorder in such condition. At this time, the T-shaped lever 68 is in the position shown in FIG. 7, wherein the right hand end of the lever 68 engages the support pin 71 for the mounting plate 61 having the pinch roller 59 so that the pinch roller 59 is not pressed against the capstan 51*c*, whereas the left hand end of the lever 68 is not allowed to engage the pin 72 provided on the mounting plate 66 having the brake member 63 so that the brake member 63 is forced against the guide pin 64 with holding the tape 42 therebetween.

The starting button 6 (see FIG. 1) of the motion picture camera 1 is operated to close the switches 31 and 32 while maintaining the tape recorder 2 in the condition shown in FIG. 7. The signal generated due to the operation of the starting button 6 is transmitted through the cable 3 to the starting circuit 9 of the tape recorder 2, which includes the OR gate circuit 18 (see FIG. 5) and is responsive to, in addition to the abovementioned signal, to the stop signal from the motion picture camera 1. In response to the generation of the starting signal due to the operation of the starting button 6, the starting circuit 9 causes the tape recorder motor 19 to start while at the same time the current flows through the solenoid driving circuit 20 (see FIGS. 3 and 5). However, the solenoid 21 is not driven until the motor 19 becomes in the steady state, since the solenoid driving circuit 20 includes the time constant or delay circuit 20*a* as shown in FIG. 5. That is, a thyristor 20*b* is switched to its conductive state after the starting of the motor 19 with the delay of a predetermined time and the turn-on of the thyristor 20*b* is followed by the switching of a transistor 20*c* to its conductive state, thus allowing the solenoid 21 to be energized. Upon the energization of the solenoid 21, the T-shaped lever 68 is pulled to turn about the pin 69 in the direction C as shown in FIG. 8 and its left hand end comes in contact with the pin 72 of the mounting plate 66, which supports the brake member 63, and pushes it down. The brake member 63 is, therefore, separated from the guide pin 44 against the action of the spring 67, allowing the travel of the tape 42 over the guide pin 44. At the same time, the right hand end of the T-shaped lever 68 is brought out of engagement with the pin 71 of the mounting plate 61, which supports the pinch roller 59, whereby the pinch roller 59 is allowed to abut against the capstan 51*c* by the resilience of the spring 62. At this time, the motor 19 is driven at constant speed and the magnetic tape 42 also travels at constant speed while the synchronizing signals and the audio signals shown in FIG. 2(*a*) are recorded on the separate tracks of the magnetic tape 42 by the magnetic heads 12 and 15 shown in FIGS. 1 and 5. For example, the synchronizing signals are generated one for each frame of the motion picture film in such a manner as opening and closing a switch connected to the shutter axle, which makes one complete revolution for each frame. The phase relations of the synchronizing signals with the opening and closing operations of the shutter are shown in FIGS. 2(*a*) and 2(*b*). As stated before, the synchronizing signals from the motion picture camera 1 are transmitted through the connector 35, the amplifier 11, etc., to the magnetic head. The audio signals from the microphone 17 (see FIG. 1) are transmitted through the audio signal amplifier 14 to the magnetic head 15. Furthermore, when the lever 68 is turned in the direction C as abovementioned, the contact 29 (see FIGS. 5 and 8) is closed to generate the starting signal, which is transmitted through the connector 30 (see FIG. 5) to the motion picture camera 1 to start the motor thereof. The camera motor can instantaneously attain to the steady driving state, since it does not employ a large inertia moment of rotary member, such as, a flywheel as used in the tape recorder, and consequently the motion picture film is fed at the predetermined frame feed speed.

When the pressure on the starting button 6 of the motion picture camera 1 is released, the rotation of the camera motor is ceased. However, the shutter tends to further rotate due to the effect of a moment of inertia of a system for transmitting the motor rotation until it reaches a predetermined angular position at which it is restricted by a stop (not shown). This eliminates the possibility that the shutter stops at its open state. When the shutter reaches the aforementioned angular position, the stop signal is generated by the stop signal generator 8 and fed to the OR gate circuit 18 of FIG. 5 to turn the transistors off, whereby the current supply to the motor 19 of the tape recorder 2 is shut off. Of course, in this case, the thyristor 20*b* and the transistor 20*c* in the solenoid driving circuit 20 are also turned off to release the solenoid 21 from the energized condition. Due to the deenergization of the solenoid 21, the T-shaped level 68 is reversed in the direction C' about the pin 69, bringing the pinch roller 59 and the brake member 63 from the positions shown in FIG. 8 into the positions shown in FIG. 7.

The foregoing descriptions of the operation of the present system will be made more clear by referring to FIG. 4.

The curve (*a*) shows the time duration during which the starting button 6 of the motion picture camera 1 is being pressed down. The curve (*b*) shows the time duration during which the motor 19, supplied with the current flow simultaneously with the pushing down of the starting button 6, is being maintained in the steady state. The letter $t'$ represents a time necessary for the motor 19 to reach the steady state, the value of which is normally on the order of 100 millisecond. The curve (*c*) shows that the solenoid 21 is energized by the solenoid driving circuit 20 with the delay of a time $t$, which is selected to have the value substantially equal to the time $t'$. That is, the time T-$t$ substantially equals the time during which the magnetic tape is travelling. The curve (*d*) shows that the rotation of the camera motor occurs simultaneously with the energization of the solenoid 21. It is clearly understood from the curves (*c*) and (*d*) that the motion picture film and the magnetic tape are fed for the substantially same time T. From the curves (*a*) and (*c*), it is noted that the motor 19 of the tape recorder stops with the delay of a time $t''$ after the release of the starting button 6 from being pushed down. This occurs due to the fact that the stop signal is not supplied to the tape recorder 2 until the shutter is brought into the aforementioned angular position after the shutting off of the current supply to the camera motor. Thus, both the motion picture film and the magnetic tape stop with the time delay of $t''$ after the release of the starting button 6 from being pushed down.

From the foregoing, it is understood that, according to the present invention, the synchronizing system allows two strips contained in separate apparatuses having different motor control systems, such as, a motion picture film in a motion picture camera and a magnetic tape in a tape recorder, to start and stop at the same time, resulting in complete synchronization of motion pictures and accompanying sound.

In addition, when it is desired to reproduce the sound recorded on the magnetic tape and to project the motion pictures recorded on the motion picture film, it is merely necessary that the tape recorder 2 is electrically connected through the connector 35 (see FIG. 5) with the motion picture projector, whereby the synchronizing signals recorded on the magnetic tape are transmitted to the motion picture projector and used as a reference signal for controlling the projector motor. Of course, the motion picture projector is provided with such an arrangement as included in the motion picture camera in order to operate the projection film in the relations shown in FIG. 4 with respect to the magnetic tape.

This invention has been described in detail with reference to the preferred embodiment, but it will be understood that variations and modifications can be effected within the spirit and scope of the invention as described hereinabove and as defined in the apended claims.

What is claimed is:

1. A system for synchronizing a motion picture apparatus including a motor, which transports a length of motion picture film and attains a steady-state speed substantially instantaneously after the current supply thereto, with a tape recorder including a motor, which transports a length of magnetic tape and takes a relatively long time as compared with that taken by the motor of the motion picture apparatus to attain a steady-state speed, said system comprising: circuit means for starting the motor of the tape recorder in response to starting operation of the motion picture apparatus; means for driving the magnetic tape after the starting of the tape recorder motor with the delay of a time at least necessary for the tape recorder motor to attain the steady-state speed; means for generating a starting signal to start the motor of the motion picture apparatus to thereby commence the transportation of the motion picture film substantially at the same time point as the transportation of the magnetic tape; and means for generating a stop signal, when the operation of the motion picture apparatus is released, to stop the motions of the motors.

2. A system as set forth in claim 1, wherein said magnetic tape driving means comprises a delay circuit consisting of a time constant circuit which enables the magnetic tape to be transported with the delay of said time, a solenoid which causes when energized the magnetic tape to be transported at a constant speed by the tape recorder motor, and circuit means for energizing said solenoid with the delay of said time.

3. A system as set forth in claim 2, wherein said starting signal generating means comprises a contact opened and closed to generate the starting signal in cooperation with the energization of said solenoid.

4. A system as set forth in claim 1, wherein said magnetic tape driving means comprises a first delay circuit consisting of a time constant circuit for delaying the time point of driving of the magnetic tape for the time at least required for the tape recorder motor to attain the steady-state speed, a second delay circuit consisting of a time constant circuit with a time constant equal to or slightly larger than that of said first delay circuit, a solenoid which causes when energized the magnetic tape to be transported at a constant speed by the tape recorder motor, and circuit means for energizing said solenoid with the delay of said time by the use of said first delay circuit.

5. A system as set forth in claim 4, wherein said starting signal generating means is designed to generate said starting signal by said second delay circuit.

6. A system as set forth in claim 1, wherein said starting signal generating means is designed to generate said starting signal when the shutter of the motion picture apparatus reaches a predetermined angular position.

7. A system as set forth in claim 1, wherein said starting circuit includes an OR circuit which causes the tape recorder motor to start in response to the start operation of the motion picture apparatus and to stop by the stop signal provided by the motion picture apparatus after the release of the start operation of the motion picture apparatus.

8. In a system for synchronizing a motion picture apparatus including a motor, which transports a length of motion picture film and attains a steady-state speed substantially instantaneously after the current supply thereto, with a tape recorder including a motor, which transports a length of magnetic tape and takes a relatively long time as compared with that taken by the motor of the motion picture apparatus to attain a steady-state speed, said system having included in the tape recorder the combination comprising:

a magnetic head for recording and reproducing audio signals;

a magnetic head for recording and reproducing synchronizing signals;

a sliding plate to support said two magnetic heads;

a shift lever for shifting said sliding plate between an operative position in which said magnetic heads contact the magnetic tape and an inoperative position in which said magnetic heads separate from the magnetic tape;

a mounting plate supporting a pinch roller movable into and out of engagement with a capstan;

a mounting plate supporting a brake member movable into and out of engagement with a guide pin guiding the magnetic tape;

a lever for turning said mounting plates when the motor of the tape recorder attains the steady-state speed to cause said pinch roller to come in contact with the capstan to transport the magnetic tape at a constant speed and to cause said brake member to be disengaged from the guide pin; and a solenoid for bringing said mounting plate turning lever into operation.

9. In a system as set forth in claim 8, wherein said spliding plate is provided with pins engageable with said mounting plates to allow the engagement and disengagement of said pinch roller and brake member into and from said capstan and guide pin.

10. In a system as set forth in claim 8, wherein said pinch roller and said brake member are disposed on the opposite sides of said magnetic heads with separating from the associated magnetic heads the substantially same distance, and further comprising a lever operating to turn said pinch roller and said brake member, a center about which said lever turns being arranged near said magnetic heads.

11. In a system as set forth in claim 8, wherein a lever when being turned by energization of said solenoid causes a contact to be closed and opened to generate a starting signal for starting the motor of the motion picture apparatus to thereby commence the transportation of the magnetic tape and motion picture film at the substantially same time point.

* * * * *